United States Patent [19]

Huynh et al.

[11] Patent Number: 4,878,114

[45] Date of Patent: Oct. 31, 1989

[54] METHOD AND APPARATUS FOR ASSESSING SURFACE ROUGHNESS

[75] Inventors: Van-Minh Huynh; Francis M. Luk, both of Windsor, Canada

[73] Assignee: University of Windsor, Windsor, Canada

[21] Appl. No.: 192,699

[22] Filed: May 10, 1988

[51] Int. Cl.$^4$ .......................... H04N 7/00; H04N 7/18
[52] U.S. Cl. .................................... 358/106; 358/101; 382/28; 364/551.01; 73/105
[58] Field of Search .................... 358/101, 106, 107; 33/567; 73/105; 364/551; 382/28

[56] References Cited

U.S. PATENT DOCUMENTS

| | | | |
|---|---|---|---|
| 3,805,035 | 4/1974 | Serra | 382/28 |
| 4,476,489 | 10/1984 | Weltlich et al. | 358/107 |
| 4,513,316 | 4/1985 | Kobayashi et al. | 358/107 |
| 4,617,682 | 10/1986 | Mori et al. | 358/107 |
| 4,667,231 | 5/1987 | Pryor | 358/107 |

OTHER PUBLICATIONS

Luk F., Huynh V. and North W., "Measurement of Surface Roughness by a Vision System", Proc. of ASME Computers in Engineering, 1987 Conf., vol. 2, Aug. 9-13, 1987, pp. 61-65, (N.Y.).

F. Luk and V. Huynh, "Vision System for In-Process Surface Quality Assessment", Proceedings of Vision '87 Conf., Jun. 8-11, 1987, Detroit, MI., pp. 12-43 to 12-58.

F. Luk, V. Huynh, W. North, "Application of Spatial Spectral Analysis to In-Line Machine Inspection of Surface Roughness", Proceedings of the IXth ICPR Conf., vol. I, Aug. 17-20, 1987, Cincinnati, Ohio, pp. 450 to 460.

Van-Minh Huynh and William Hugh Miller, "A New Optical Method for the Measurement of Roughness of Paper Surfaces", Proceedings of the SID, vol. 28/84, 1987, pp. 471 to 475.

Primary Examiner—John K. Peng
Attorney, Agent, or Firm—Foley & Lardner, Schwartz, Jeffery, Schwaab, Mack, Blumenthal & Evans

[57] ABSTRACT

A relatively low cost processor based optical system is used to carry out the method. An area of the surface whose roughness is to be assessed is illuminated by a light source, and a reflected light is directed to the lens of the video camera. The analog output of the video camera is digitized, and the digital signal is provided to a processor which performs an analysis to provide a parameter indicative of the roughness of the surface.

11 Claims, 2 Drawing Sheets

METHOD AND APPARATUS FOR ASSESSING SURFACE ROUGHNESS

BACKGROUND OF INVENTION

1. Field of the Invention

The invention relates to a method for assessing the roughness of planar surfaces of manufactured products, and an apparatus for carrying out the method. More specifically, the invention relates to such a method using a processor based optical system.

2. Description of Prior Art

Surface roughness measurement is becoming one of the important measurement processes in production as manufacturing industries are more concerned about their product quality and reliability. Proper control of surface finish of machined parts not only reduces the production cost of the part but also lowers the amount of scrap. In addition, surface roughness measurement is required not only for ensuring the quality of the part, but also for monitoring tool vibration and tool wear. Early detection in tool wear allows a replacement of tools before any impending failure.

Surface roughness is also one of the important considerations in the selection of paper for printing as it affects both print quality and paper handling characteristics in hard copy devices.

Various methods have been developed to assess surface quality and to derive a roughness parameter which can be related to the quality of the surface.

The traditional way of directly measuring the surface roughness is by a Talysurf in which the movement of a stylus is correlated to the surface profile. These devices electronically correlate the motion of a diamond-tip stylus to the roughness of the surface under investigation. The major disadvantage for such instruments is that they require direct physical contact which limits the measuring speed. In addition, the instrument readings are based on a limited number of line samplings which may not represent the real characteristics of the surface. Because of the slow measuring speed, quality controls based on such instruments are often performed on a very limited number of samples.

Air-leak instruments are most commonly used in the printing industry because they are simple and convenient to use. These include Bekk, Bendtsen, Gurley Hill, and Sheffield testers. Despite the popularity of the test carried out with these instructions, the tests are, in general, not conducted under the same pressure as an actual printing, and thus they do not necessarily correlate well with print quality. For improvement, the Parker Print surf was developed to adapt to different printing pressure. However, the inherent drawback of this latter device is that the measured air-leak is not only a function of paper roughness but also the material porosity which is difficult to measure separately.

Electro-optical devices have been introduced as a better alternative for non-contact roughness measurements. Linear diode arrays are often used in these systems for measuring the intensity of reflected light from coherent light sources. These systems can achieve a faster inspection speed, however, they do not provide enough information to characterize the surface topography and surface texture which are needed for applications in machining process monitoring. Furthermore, most of these systems are for laboratory use, and are not suitable for high speed automated inspection in a production environment.

SUMMARY OF INVENTION

It is therefore an object of the invention to provide a novel method for assessing the roughness of planar surfaces of manufactured products which overcomes the above disadvantages.

It is a further object of the invention to provide an apparatus for carrying out the method.

In accordance with the invention, the method is carried out by a relatively low cost processor based optical system. An area of the surface whose roughness is to be assessed is illuminated by a light source, and the reflected light is directed to the lens of a video camera. The analog output of the video camera is digitized, and the digital signal is provided to a processor which performs an analysis to provide a parameter indicative of the roughness of the surface.

The novel method makes use of the property of the unique light scattering pattern of a machine surface from which several descriptors are derived to check surface flaws and to measure surface roughness.

A histogram of grey-level distribution of the image is obtained from which statistical parameters are calculated to derive an optical roughness value.

BRIEF DESCRIPTION OF DRAWINGS

The invention will be better understood by an examination of the following description, together with the accompanying drawings, in which.

DESCRIPTION OF PREFERRED EMBODIMENTS

Figure 1:
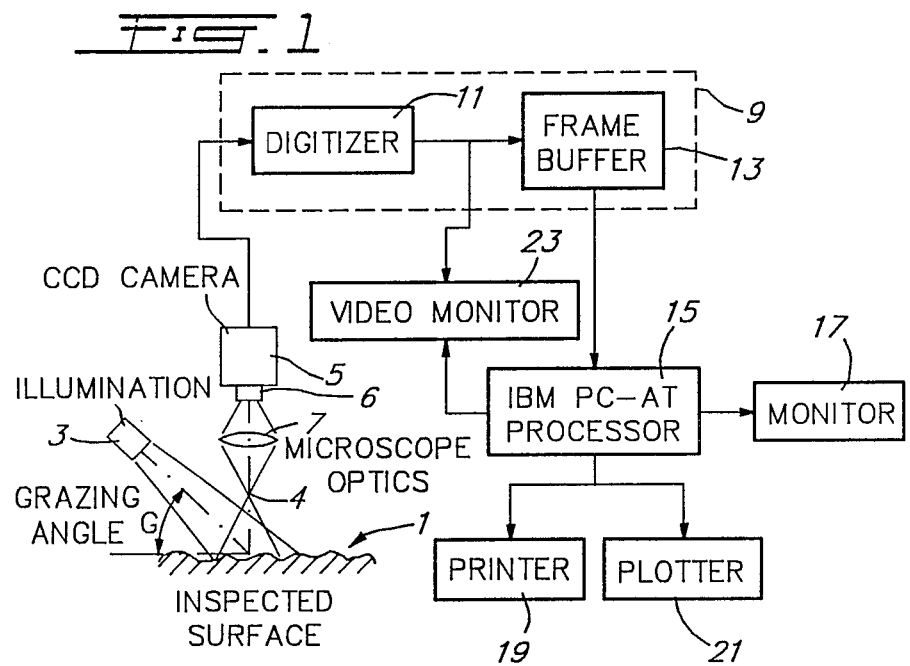
FIG. 1 is a block diagram of the inventive system for carrying out the inventive method.

Referring to FIG. 1, a surface 1, whose roughness is to be assessed, is disposed in the path of illumination of a source of illumination 3 which illuminates an area of the surface. The light source is preferably a collimated 12 W tungsten lamp which is directed at the inspected surface at a small grazing angle G. Although not shown in FIG. 1, it will of course be appreciated that the source of illumination 3 will include means for adjusting the grazing angle G as well as means for adjusting the distance of the source of illumination 3 from the surface 1. In a particular embodiment of the invention, the optimum setting of the grazing angle was 7.5 degrees and the optimal distance was 100 mm. (Luk, F., Huynh, V. and North, W., "Measurement of Surface Roughness by a Vision System", ASME International Computers in Engineering Conference, 1987, the contents of which are incorporated herein by reference.)

A video camera 5, having an input lens 6, is mounted above the surface so that the lens is trained on the area illuminated by the source of illumination 3. Reflected light 4 from the illuminated area is directed at the lens of the video camera 5 whereby to provide an analog output representative of surface characteristics of the area. The reflected light 4 is preferably directed to the lens 6 through microscope optics 7. In one embodiment, the video camera is a Pulnix industrial CCD (charge coupled device) camera fitted with a Unitron microscope optical system which is capable of giving 200× magnification. This camera is a black and white video camera with a resolution of 384(h)×491(v) pixels.

The analog output is provided to frame grabber 9, which may comprise a Matrox PIP-1024 imaging board which includes a digitizer 11 and a frame buffer 13. The digitized signal is then fed to processor 15 which may comprise an IBM PC-AT microprocessor having a monitor 17. The output of the processor 15 may then be fed to a printer 19, a plotter 21, or both.

The output of the digitizer 11 may also be fed to a video monitor 23 whose second output is fed from the processor 15. The video monitor displays a magnified image of the area of the surface 1 under inspection.

In operation, the surface of a product to be inspected is disposed under the camera as in FIG. 1. The source of illumination is adjusted for its optimum grazing angle G and distance from the surface, and the source of illumination is turned on. The analog signal generated by the camera is transferred to the frame grabber board 9 for signal processing and analysis. The digitizer digitizes the analog signals through its A/D converter to generate an image, when the Matrox PIP-1024 imaging board is used, of 512×512×8 bit pixels in approximately 1/30th of a second. Each pixel is contained in a single byte and hence represents the intensity of light at a given point in 256 discrete intensity levels of which 0 is the darkest and 255 the brightest. A histogram of the frequency distribution of the grey levels of the digitized image is subsequently obtained. From this histogram, calculations are made to determine the roughness parameter R which is defined by:

$$R = SD/RMS$$

where:

SD = standard deviation of the distribution
RMS = root mean square height of the distribution.

The numerical calculations for these parameters were performed as follows:

$$SD = \left[ \sum_{i=0}^{n} F_i (X_i - X)^2 / (N - 1) \right]^{0.5}$$

$$RMS = \left[ \left( \sum_{i=0}^{n} F_i^2 \right) / N \right]^{0.5}$$

where:

$$X = \left( \sum_{i=0}^{n} F_i X_i \right) / N$$

$$N = \sum_{i=0}^{n} F_i$$

$F_i$ = number of pixels at grey level $X_i$ as determined from the histogram, and
n = 255 for the Matrox PIP-1024 board.

The skewness of the distribution is defined as follows:

$$S = \left[ \sum_{i=0}^{n} F_i (X_i - X)^3 / \{(N - 1) * SD^3\} \right]$$

Specific examples are given in F. Luk and V. Huynh, "Vision System for In-Process Surface Quality Assessment", Proceedings of Vision '87 Conference, June 8–11, 1987, Detroit, MI., the contents of which are incorporated herein by reference.

Figure 2:
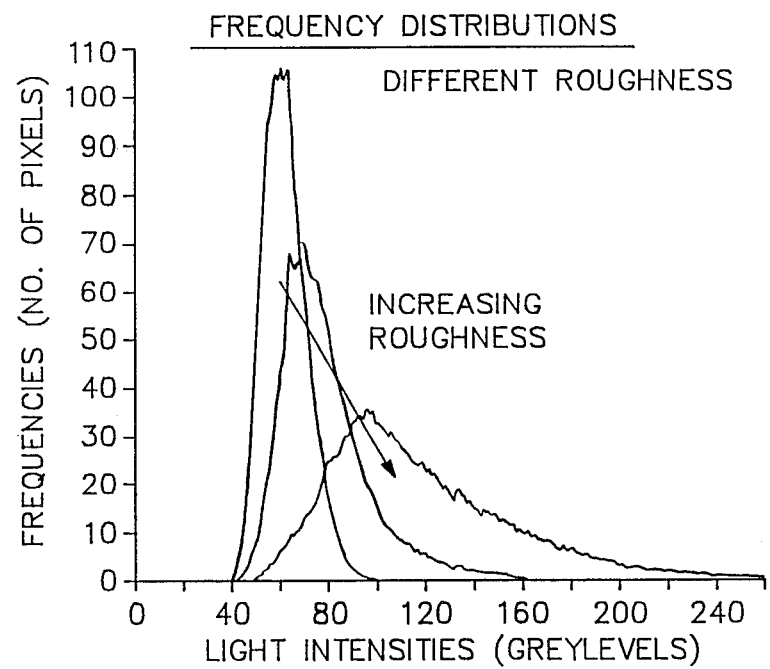
FIG. 2 illustrates frequency distributions of the intensity of the reflective lights from tool steel samples machined to different roughnesses.

FIG. 2 illustrates the grey-level histograms of the scattered light patterns of tool steel samples which are ground to different roughnesses. The frequency distributions in this Figure are uni-modal and skewed slightly to the right (skewness is positive). As the surface roughness increases, the spread and the mean value of the distribution increase, while the height of the distribution decreases. This indicates that for rougher surfaces, the light scattering effect is greater.

We have above described one method for determining the roughness parameter. Other methods are available as described, for example, in F. Luk, V. Huynh, W. North, "Application of Spatial Spectral Analysis to In-line Machine Inspection of Surface Roughness", Proceedings of the IXth ICPR Conf., Vol. I, Aug. 17–20, 1987, Cincinnati, Ohio, the contents of which are incorporated herein by reference.

Figure 3:
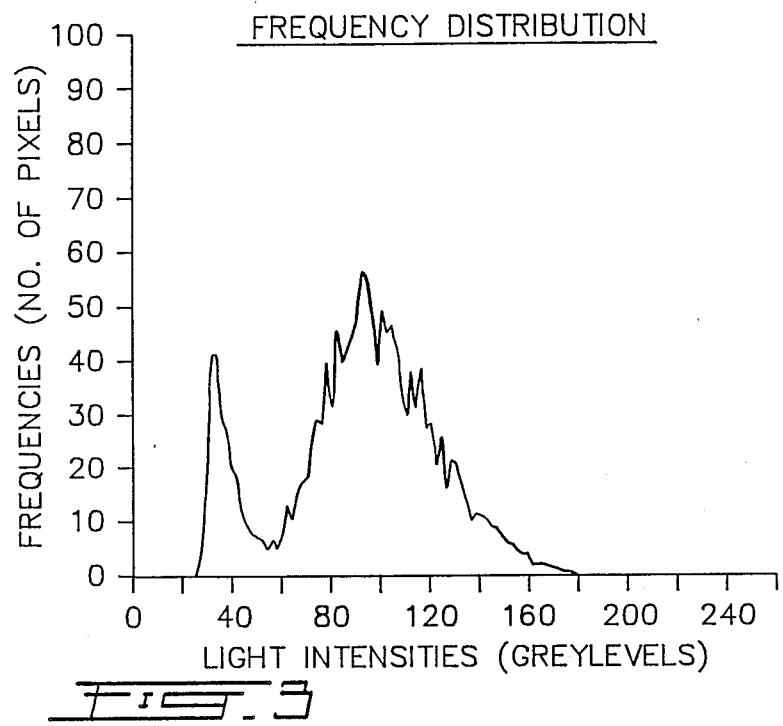
FIG. 3 is a histogram of a surface with surface flaws.

It is also possible to detect surface flaws using the inventive method and system. Surface flaws are irregularities which do not occur in any consistent pattern such as surface defects, scratches, indents, etc. These irregularities change the light scattering characteristic of the surface. The grey-level histogram of the damaged surface is the combination of two entirely different populations: one belongs to the regular surface and the other, the flaws. The population belonging to surface flaws has a lower mean and a much smaller spread. The addition of this population to that of the regular surface causes a shifting of distribution from uni-modal to bi-modal with the second peak at the left side of the distribution as illustrated in FIG. 3 hereof. The form of this peak depends on the size, the amount and severity of the flaws.

The addition of the flaw population to the original distribution also causes the skewness of the histogram to decrease from a slightly positive value to a negative value. By utilizing this property, one can check the presence of the surface flaws by simply detecting the sign of the skewness of the distribution.

Accordingly, in one embodiment, and especially with machine parts, one would first check for the presence or absence of flaws. The check is performed by calculating the sign of skewness using the above formulae. If there is a flaw, then the part can be immediately discarded. If there is no flaw, then the roughness parameter can be calculated to determine whether it falls between two predetermined levels. If it does not, then it is discarded. If it does, then it is acceptable.

Figure 4:
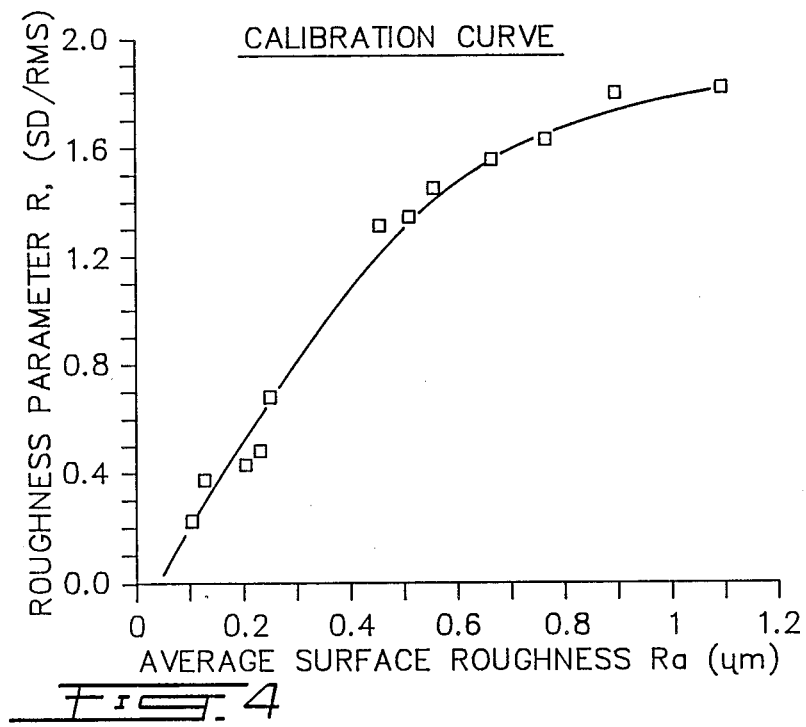
FIG. 4 is a calibration curve relating optical roughness to surface roughness.

In one set of tests, a system as above-described was calibrated using a series of tool steel samples. By measuring the optical roughness of the samples, a set of R values was obtained. These were plotted against the average surface roughness Ra obtained from a Talysurf instrument. A curve was fitted to the data as shown in FIG. 4. It can be seen that this curve is linear for Ra between 0.1 to 0.5 μm which is the practical range for most machining processes. Beyond this range, the slope of the curve gradually decreases with increasing roughness.

This curve, once established, can be used as a calibration curve to relate the optical roughness measurement as determined by the system to mechanical roughness. In practice, only a few limited samples need to be used to generate the linear portion of the calibration curve even though the calibration curve for different materials is different.

Although the method has been above-described for use in determining the roughness of machine surfaces, it can also be used to determine the roughness of paper surfaces as described in Huynh, V., Miller, W. H., "A New Optical Method for the Measurement of Roughness of Paper Surfaces", Proceedings of the SID, Vol. 28/4, 1987, the contents of which are incorporated herein by reference.

Although several embodiments have been above described, this was for the purpose of illustrating, but not limiting, the invention. Various modifications, which will come readily to the mind of one skilled in the art, are within the scope of the invention as defined in the appended claims.

We claim:

1. A processor based optical system for assessing the roughness of a planar surface of a manufactured product;

said system comprising:
a source of illumination adjustable to illuminate an area of said planar surface;
a video camera, having an input lens and an output means, said camera being mountable above said area such that said input lens is trained on said area to provide an analog output representative of surface characteristics of said area;
frame grabber means, having an input means connected to said output means of said video camera, said frame grabber means digitizing said analog output to provide digital signals corresponding to said analog output;
processor means for performing an analysis of said digital signals and providing a parameter indicative of said roughness;
and further including a video monitor having a first input terminal and a second input terminal;
said first input terminal of said video monitor being connected to an output of said frame grabber means;
said second input terminal being connected to an output of said processor means.

2. A system as defined in claim 1 and including microscope optics between said area and said input lens.

3. A system as defined in claim 1 wherein said processor comprises a personal computer microprocessor having a monitor.

4. A system as defined in claim 1 and further including a printer and a plotter, said printer and said plotter being connected to an output of said processor.

5. A system as defined in claim 1 wherein said frame grabber comprises a digitizer and a frame buffer; an output of said digitizer being connected to said first input terminal of said video monitor.

6. A system as defined in claim 1 wherein said video camera comprises a CCD (charge coupled device) television camera.

7. A method for assessing the roughness of a planar surface of a manufactured product using a processor based optical system;

said system comprising:
a source of illumination;
a video camera having an input lens;
frame grabber means; and
processor means;
said method comprising:
adjusting said source of illumination to illuminate an area of said surface;
training said input lens of said video camera on said area whereby to receive reflected light from said area at said camera lens;
said camera thereby providing an analog output representative of said area;
providing said analog output to said frame grabber means;
said frame grabber means digitizing said analog output to provide digital signals corresponding to said analog output;
providing said digital signals to said processor;
said processor performing an analysis of said digital signals to provide a parameter indicative of said roughness;
wherein said system includes a video monitor having a first input thereof connected to said frame grabber means and a second input thereof connected to said processor means;
whereby, a magnified image of said area is presented on said video monitor.

8. A method as defined in claim 7 wherein said system includes microscope optics between said area and said lens whereby said reflected light is provided to said camera lens through said microscope optics.

9. A method as defined in claim 8 wherein said frame grabber comprises a digitizer and a frame buffer; the output of said digitizer being connected to the first input terminal of said video monitor and said frame buffer.

10. A method as defined in claim 8 wherein said parameter comprises a roughness parameter R which is defined by:

$$R = SD/RMS$$

where:
SD = standard deviation of the distribution
RMS = root mean square height of the distribution
The numerical calculations for these parameters were performed as follows:

$$SD = \left[ \sum_{i=0}^{n} F_i (X_i - X)^2 / (N - 1) \right]^{0.5}$$

$$RMS = \left[ \left( \sum_{i=0}^{n} F_i^2 \right) / N \right]^{0.5}$$

where:

$$X = \left( \sum_{i=0}^{n} F_i X_i \right) / N$$

$$N = \sum_{i=0}^{n} F_i$$

$F_i$ = number of pixels at grey level $X_i$ as determined from the histogram, and
n = 255 for the Matrox PIP-1024 board.

11. A method as defined in claim 10 and including the step of determining the skewness of the distribution, said skewness of the distribution being defined as follows:

$$S = \left[ \sum_{i=0}^{n} F_i (X_i - X)^3 / \{(N - 1) * SD^3\} \right].$$

* * * * *